United States Patent
Zirnheld

(10) Patent No.: US 10,015,464 B2
(45) Date of Patent: Jul. 3, 2018

(54) METHOD, APPARATUS AND COMPUTER PROGRAM PRODUCT FOR MODIFYING ILLUMINATION IN AN IMAGE

(71) Applicant: Nokia Corporation, Espoo (FI)

(72) Inventor: Arnaud Zirnheld, Malmö (SE)

(73) Assignee: Nokia Technologies Oy, Espoo (FI)

( * ) Notice: Subject to any disclaimer, the term of this patent is extended or adjusted under 35 U.S.C. 154(b) by 908 days.

(21) Appl. No.: 14/514,717

(22) Filed: Oct. 15, 2014

(65) Prior Publication Data

US 2015/0109417 A1    Apr. 23, 2015

(30) Foreign Application Priority Data

Oct. 21, 2013   (GB) .................................. 1318530.1

(51) Int. Cl.
*H04N 13/00*    (2018.01)
*H04N 5/232*    (2006.01)

(52) U.S. Cl.
CPC ..... *H04N 13/0007* (2013.01); *H04N 5/23229* (2013.01)

(58) Field of Classification Search
USPC ..................................................... 348/42–60
See application file for complete search history.

(56) References Cited

U.S. PATENT DOCUMENTS 6,980,697 B1    12/2005  Basso et al.
8,447,098 B1 *   5/2013  Cohen ..................... G06T 7/593
                                                         382/154

(Continued)

FOREIGN PATENT DOCUMENTS

CN    101872491 A    10/2010
EP      2372663 A2    10/2011

(Continued)

OTHER PUBLICATIONS

Extended European Search Report received for corresponding European Patent Application No. 14855261.5, dated May 18, 2017, 10 pages.
Office action received for corresponding Chinese Patent Application No. 201480065209.4, dated Jul. 5, 2017, 9 pages of office action and 3 pages of translation available.
Wong et al., "Interactive Re-lighting of Panoramas", IEEE Computer Graphics and Applications, vol. 21, No. 2, Mar.-Apr. 2001, 12 Pages.

(Continued)

*Primary Examiner* — Dave Czekaj
*Assistant Examiner* — Shanika Brumfield
(74) *Attorney, Agent, or Firm* — Nokia Technologies Oy

(57) ABSTRACT

In accordance with an example embodiment a method, apparatus and a computer program product are provided. The method comprises partitioning an image into a plurality of super pixel cell areas and determining surface orientations for the plurality of super pixel cell areas. A surface orientation is determined for a super pixel cell area based on depth information associated with the image. The method further comprises receiving at least one virtual light source indication for modifying an illumination associated with the image. The illumination is modified by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

22 Claims, 7 Drawing Sheets

(56) References Cited

U.S. PATENT DOCUMENTS

| | | | |
|---|---|---|---|
| 2003/0052981 A1* | 3/2003 | Kakarala | G06T 3/4007 348/272 |
| 2003/0123713 A1 | 7/2003 | Geng | |
| 2007/0273686 A1 | 11/2007 | Watanabe et al. | |
| 2011/0285822 A1 | 11/2011 | Dai et al. | |
| 2013/0127860 A1* | 5/2013 | Hadap | G06T 7/507 345/426 |
| 2013/0129190 A1 | 5/2013 | Cohen et al. | |
| 2014/0085398 A1* | 3/2014 | Tian | H04N 7/15 348/14.01 |

FOREIGN PATENT DOCUMENTS

| | | |
|---|---|---|
| EP | 2378488 A2 | 10/2011 |
| EP | 2426612 A1 | 3/2012 |
| GB | 2500405 A | 9/2013 |
| WO | 2007/142649 A1 | 12/2007 |

OTHER PUBLICATIONS

Malassiotis et al., "Pose and Illumination Compensation for 3D Face Recognition", International Conference on Image Processing, vol. 1, Oct. 24-27, 2004, 4 pages.

Search Report received for corresponding United Kingdom Patent Application No. 1318530.1, dated Apr. 14, 2014, 3 pages.

International Search Report and Written Opinion received for corresponding Patent Cooperation Treaty Application No. PCT/FI2014/050778, dated Jan. 14, 2015, 14 pages.

Abbott et al., "Interactive Depth-Aware Effects for Stereo Image Editing", International Conference on 3D Vision, Jun. 29-Jul. 1, 2013, pp. 263-270.

Guan et al., "Image Relighting and Matching With Illumination Information", 19th IEEE International Conference on Image Processing, Sep. 30-Oct. 3, 2012, pp. 2941-2944.

Bergh et al., "Real-Time Stereo and Flow-Based Video Segmentation With Superpixels", IEEE Workshop on Applications of Computer Vision, Jan. 9-11, 2012, pp. 89-96.

* cited by examiner

METHOD, APPARATUS AND COMPUTER PROGRAM PRODUCT FOR MODIFYING ILLUMINATION IN AN IMAGE

TECHNICAL FIELD

Various implementations relate generally to method, apparatus and computer program product for modifying illumination in an image.

BACKGROUND

Electronic devices like mobile phones and tablet computers are being increasingly configured with digital cameras for facilitating image capture. A digital camera includes one or more image sensors. The image sensors are sensitive to incident light, such as light reflected from objects of interest during image capture, which facilitates in capturing of the images of the objects. A number of factors, such as ambient lighting conditions and/or a direction of a light source may affect an illumination associated with the objects in the captured image. In certain scenarios, an image illumination may need to be modified on account of variety of reasons, such as for example, for facilitating virtual reality applications, for introducing lighting effects (e.g. black and white pictures) and the like. Typically, modifying image illumination involves utilizing special editing devices and software for controlling imaging artefacts. As such, modifying illumination in images while precluding complexity and special editing devices/software is a challenge.

SUMMARY OF SOME EMBODIMENTS

Various aspects of example embodiments are set out in the claims.

In a first aspect, there is provided a method comprising: partitioning an image into a plurality of super pixel cell areas; determining surface orientations for the plurality of super pixel cell areas, wherein a surface orientation is determined for a super pixel cell area from among the plurality of super pixel cell areas based on depth information associated with the image; receiving at least one virtual light source indication for modifying an illumination associated with the image; and modifying the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

In a second aspect, there is provided an apparatus comprising: at least one processor; and at least one memory comprising computer program code, the at least one memory and the computer program code configured to, with the at least one processor, cause the apparatus to at least perform: partition an image into a plurality of super pixel cell areas; determine surface orientations for the plurality of super pixel cell areas, wherein a surface orientation is determined for a super pixel cell area from among the plurality of super pixel cell areas based on depth information associated with the image; receive at least one virtual light source indication for modifying an illumination associated with the image; and modify the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

In a third aspect, there is provided a computer program product comprising at least one computer-readable storage medium, the computer-readable storage medium comprising a set of instructions, which, when executed by one or more processors, cause an apparatus to at least perform: partition an image into a plurality of super pixel cell areas; determine surface orientations for the plurality of super pixel cell areas, wherein a surface orientation is determined for a super pixel cell area from among the plurality of super pixel cell areas based on depth information associated with the image; receive at least one virtual light source indication for modifying an illumination associated with the image; and modify the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

In a fourth aspect, there is provided an apparatus comprising: means for partitioning an image into a plurality of super pixel cell areas; means for determining surface orientations for the plurality of super pixel cell areas, wherein a surface orientation is determined for a super pixel cell area from among the plurality of super pixel cell areas based on depth information associated with the image; means for receiving at least one virtual light source indication for modifying an illumination associated with the image; and means for modifying the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

In a fifth aspect, there is provided a computer program comprising program instructions which when executed by an apparatus, cause the apparatus to: partition an image into a plurality of super pixel cell areas; determine surface orientations for the plurality of super pixel cell areas, wherein a surface orientation is determined for a super pixel cell area from among the plurality of super pixel cell areas based on depth information associated with the image; receive at least one virtual light source indication for modifying an illumination associated with the image; and modify the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 8 of the drawings.

Figure 1:
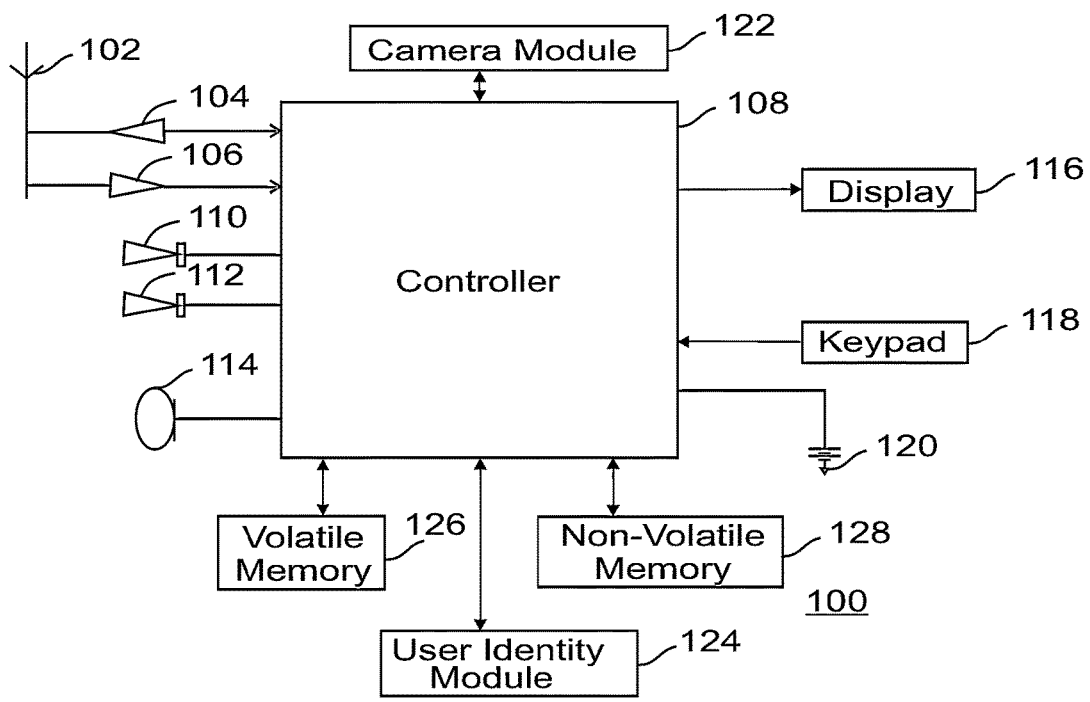
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment, the media capturing element is a camera module 122 which may include a digital camera capable of forming a digital image file from a captured image. As such, the camera module 122 includes all hardware, such as a lens or other optical component(s), and software for creating a digital image file from a captured image frame. Alternatively, or additionally, the camera module 122 may include the hardware needed to view an image frame, while a memory device of the device 100 stores instructions for execution by the controller 108 in the form of software to create a digital image file from a captured image frame. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. In an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
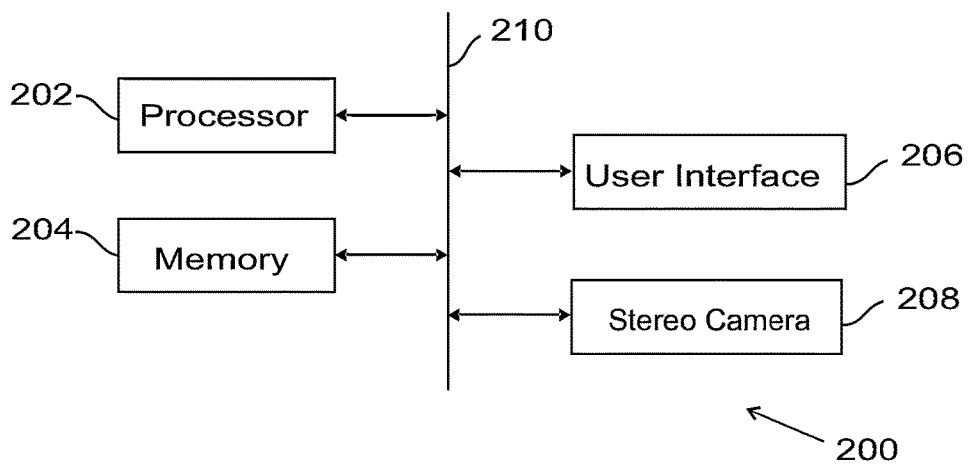
FIG. 2 illustrates an apparatus for modifying illumination in an image in accordance with an example embodiment.

FIG. 2 illustrates an apparatus 200 for modifying illumination in an image in accordance with an example embodiment. The apparatus 200 for modifying illumination in the image may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100) or in a combination of devices. It should also be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to store images captured using various components of the apparatus 200. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver.

In an example embodiment, the electronic device may be embodied as to include a stereo camera 208. The stereo camera 208 may be in communication with the processor 202 and/or other components of the apparatus 200. In an embodiment, the stereo camera 208 may be in communication with other imaging circuitries and/or software, and is configured to capture digital images or to make a video or other graphic media files. The stereo camera 208 and other circuitries, in combination, may be an example of the camera module 122 of the device 100. In certain example embodiments, the stereo camera 208 may be external to the apparatus 200, but accessible and/or controlled by the apparatus 200. In an embodiment, the stereo camera 208 may include a pair of lens, an image sensor and requisite imaging circuitry to capture and sense incident light reflected from objects during image capture. In an embodiment, a user may provide an indication of user intent to capture an image and/or video using the user interface 206 of apparatus 200, which may cause the processor 202 and the memory 204 of the apparatus 200 to cause the lens in the stereo camera 208 to receive incident light and direct the incident light along the optical path towards the image sensor for facilitating image capture.

The components 202-208 of the apparatus 200 may communicate with each other via a centralized circuit system 210 for modifying illumination of an image. The centralized circuit system 210 may be various devices configured to, among other things, provide or enable communication between the components 202-208 of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to partition an image (for example, an image from among a pair of images captured using the stereo camera 208) into a plurality of super pixel cell areas. The image may be partitioned into the plurality of super pixel cell areas (for example, into sets of pixels), such that each super pixel cell area includes a plurality of pixels. In an embodiment, image partitioning/segmentation techniques may be utilized for partitioning of the image into a plurality of super pixel cell areas. Examples of the image partitioning/segmentation techniques may include, but are not limited to, thresholding techniques, clustering algorithms (for example, K means algorithm), edge detection techniques and the like. An example visual representation of a partitioned image is depicted in FIG. 3.

Figure 3:
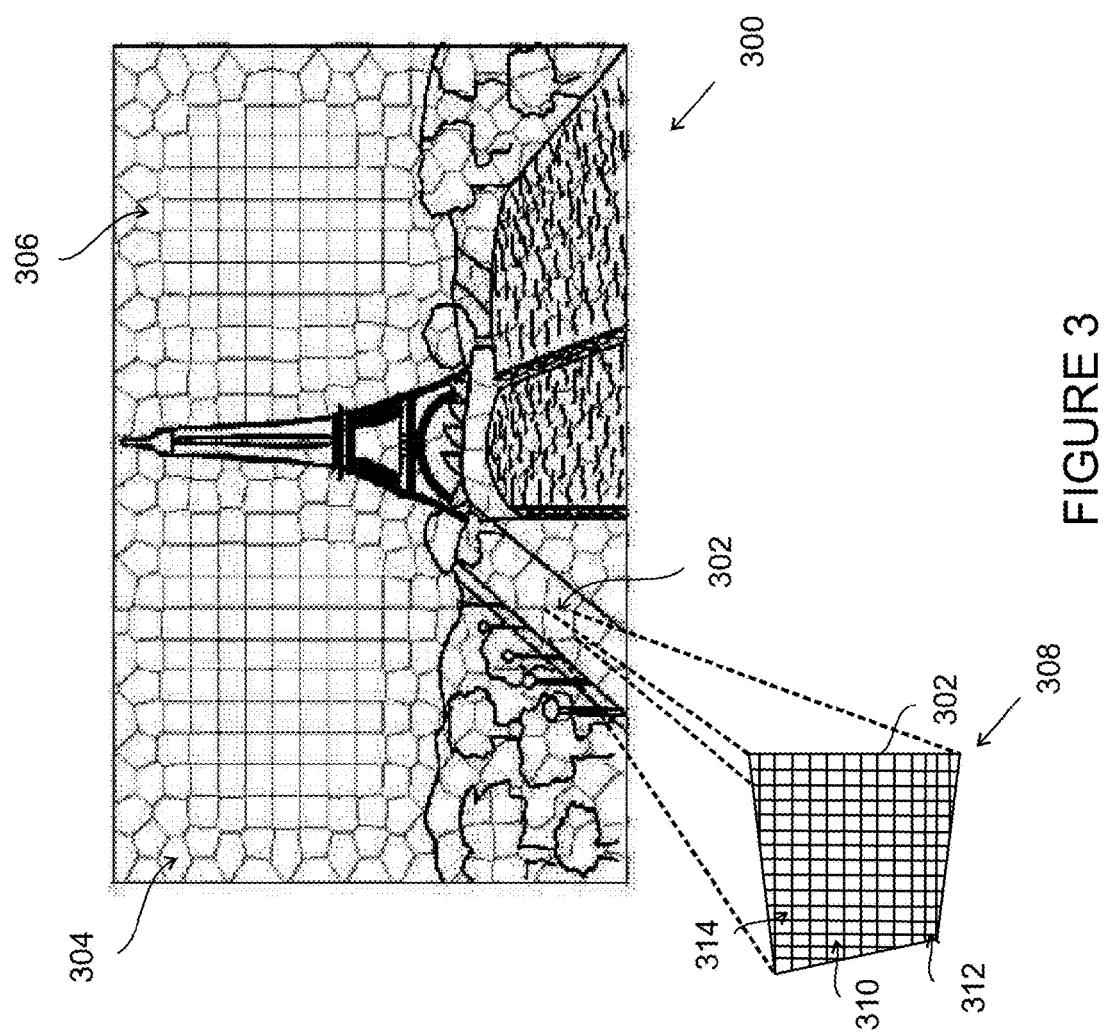
FIG. 3 depicts an example visual representation of an image partitioned into a plurality of super pixel cell areas in accordance with an example embodiment.

Referring now to FIG. 3, an example visual representation of an image 300 partitioned into a plurality of super pixel cell areas is depicted in accordance with an example embodiment. As explained above, image partitioning/segmentation technique may be utilized for the partitioning of the image 300 into the plurality of super pixel cell areas, such as super pixel cell area 302, super pixel cell area 304, super pixel cell area 306 and the like. It is understood that the super pixel cell areas 302, 304 and 306 are referenced herein for illustration purposes and that the partitioned image 300 includes a number of super pixel cell areas, such as the super pixel cell areas 302, 304 and 306. Each super pixel cell area from among the plurality of super pixel cell areas includes several pixels as depicted in the inset view 308 of magnified super pixel cell area 302. In the inset view 308, the magnified super pixel cell area 302 is depicted to include pixels, such as pixel 310, pixel 312 and 314. It is understood that pixels 310, 312 and 314 are referenced herein for illustration purposes and that the super pixel cell area 302 includes several pixels, such as the pixels 310, 312 and 314. In an example embodiment, a processing means may be configured to partition the image 300 into a plurality of super pixel cell areas. An example of the processing means may include the processor 202, which may be an example of the controller 108.

Referring now to FIG. 2, in an example embodiment, the processor 202 is configured to, with the content of the memory 204, and optionally with other components described herein, to cause the apparatus 200 to determine surface orientations for the plurality of super pixel cell areas. In an example embodiment, a surface orientation (for example an angle subtended by a surface associated with a super pixel cell area to a light source at the time of image capture) may be determined for each super pixel cell area from among the plurality of super pixel cell areas based on depth information associated with the image. In an embodiment, a surface orientation for a super pixel cell area is determined by (1) assigning normals for pixels corresponding to the super pixel cell area based on depth information associated with the image and (2) averaging the normals assigned to the pixels to generate an average normal. The average normal is determined to be the surface orientation for the super pixel cell area. The determination of a surface orientation for a super pixel cell area is further explained with reference to FIG. 4.

Figure 4:
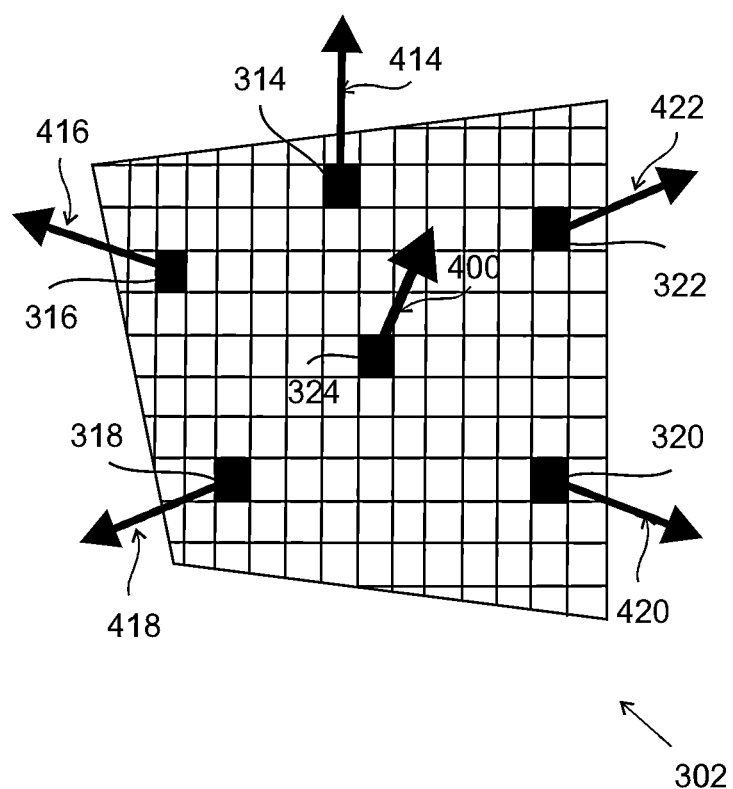
FIG. 4 depicts an example visual representation of the magnified super pixel cell area of FIG. 3 for illustrating determination of a surface orientation for the super pixel cell area in accordance with an example embodiment.

Referring now to FIG. 4, an example visual representation of the magnified super pixel cell area 302 of FIG. 3 is depicted for illustrating determination of a surface orientation for the super pixel cell area 302 in accordance with an example embodiment. As explained with reference to FIG. 3, the super pixel cell area 302 includes several pixels, such as pixels 314, 316, 318, 320, 322, and 324. A normal may be assigned to each pixel as depicted in FIG. 4. For example, pixel 314 is associated with normal 414, pixel 316 is associated with normal 416, pixel 318 is associated with normal 418, pixel 320 is associated with normal 420 and pixel 322 is associated with normal 422. Normals, such as the normals 414-422, may be associated with each pixel of the super pixel cell area 302. In an example embodiment, the normals are assigned to the pixels based on depth information associated with image comprising the super pixel cell area 302 (for example, the image 300 of FIG. 3). In an example embodiment, the processor 202 is configured to, with the content of the memory 204, and optionally with other components described herein, to cause the apparatus 200 of FIG. 2 to generate at least a coarse estimate of one of a depth map and disparity map for the image 300 for generating the depth information associated with the image 300. In an embodiment, the coarse estimate of a disparity map may be derived from a stereo pair of images (including the image 300 as one of the images from among the stereo pair of images) captured by the stereo camera 208 of FIG. 2. An estimate of the depth map may be derived from the disparity map. The difference in angle of capture of a scene by the pair of cameras in the stereo camera 208 may be utilized to geometrically derive a distance of the object from the stereo camera 208 to construct the depth/disparity map. The generation of the coarse estimate of a depth map or a disparity map may be performed using any of a number of known techniques and is not explained herein for sake of brevity. In an example embodiment, a processing means may be configured to generate at least a coarse estimate of one of a depth map and disparity map for the image 300 for generating the depth information associated with the image 300. An example of the processing means may include the processor 202, which may be an example of the controller 108.

In an example embodiment, the processor 202 is configured to, with the content of the memory 204, and optionally with other components described herein, to cause the apparatus 200 to average the assigned normals to the pixels of the super pixel cell area 302. For example, normals such as 414-422 along with other such normals may be averaged to generate an average normal 400 at the pixel 324 as exemplarily depicted in FIG. 4. A direction of the average normal 400 may be considered as an indication of the surface orientation of the super pixel cell area 302. A surface orientation may similarly be computed for each super pixel cell area (such as super pixel cell areas 304, 306 and the like) obtained after partitioning of the image 300. In an example embodiment, a processing means may be configured to determine surface orientations for the plurality of super pixel cell areas. An example of the processing means may include the processor 202, which may be an example of the controller 108.

Referring back to FIG. 2, in an example embodiment, the determination of the surface orientation for a super pixel cell area, such as the super pixel cell area 302 of FIG. 3, results in one or more artefacts, which may degrade a quality of the image upon subsequent modification of an image illumination. For example, on account of partitioning the image into super pixel cell areas and on account of normal discontinuities between two adjacent pixels on super pixel cell area edges, artefacts may be generated which be result in image degradation. In an example embodiment, the processor 202 is configured to, with the content of the memory 204, and optionally with other components described herein, to cause the apparatus 200 to employ one or more filters to counteract artefacts generated during the determination of the surface orientations for the super pixel cell areas. In an example embodiment, a shading filter, such as Phong shading filter (not shown in FIG. 2) may be employed to counteract the faceting artefacts generated during the determination of the surface orientations for the super pixel cell areas. In an example embodiment, a filter configured to preclude depth discontinuities inside a super pixel cell area may be employed to counteract artefacts resulting from depth estimation errors or segmentation errors at a pixel level. In an example embodiment, a processing means may be configured to employ the one or more filters to counteract artefacts generated during the determination of the surface orientation for each super pixel cell area. An example of the processing means may include the processor 202, which may be an example of the controller 108.

In an example embodiment, the processor 202 is configured to, with the content of the memory 204, and optionally with other components described herein, to cause the apparatus 200 to receive at least one virtual light source indication for modifying an illumination associated with the image. In an embodiment, receiving the at least one virtual light source indication includes receiving at least one vector, where a vector is indicative of a virtual light source direction. In an embodiment, receiving the at least one virtual light source indication includes receiving at least one virtual light source position. A virtual light source position includes one of two-dimensional (2D) positional information and three-dimensional (3D) positional information corresponding to a virtual light source. In an example embodiment, the processor 202 is configured to, with the content of the memory 204, and optionally with other components described herein, to cause the apparatus 200 to compute at least one vector from the at least one virtual light source position. In an embodiment, a vector from among the at least one vector is indicative of a virtual light source direction. The receipt of the at least one virtual source indication is further explained below:

For example, an image may be captured by the stereo camera 208 in ambient lighting (for example, natural lighting or artificial lighting) conditions and the image may be accordingly be associated with an illumination (also referred herein as current illumination). A user associated with the apparatus 200 may intend to modify the captured image. For example, the user may intend to simulate an effect of sunshine in the captured image. For a far away virtual light source (like the sun), the user may provide a direction (for example, in form of x, y and z co-ordinate information), which serves as the vector indicating virtual light source direction. In an example embodiment, the user may also intend to reduce brightness of burnt areas (for example, areas with higher amount of brightness masking image details) in the image. In such a case, the vector may indicate a direction for modifying illumination by removing the brightness from some regions in the image. In an embodiment, the user may intend to simulate an effect of a candle light in the captured image. For an isotropic light source (like the candle), the user may provide a 3D position of a virtual light source to the apparatus 200. The processor 202 is configured to, with the content of the memory 204, and optionally with other components described herein, to cause the apparatus 200 to compute vectors by connecting the 3D position to centers of individual super pixel cell areas for determining the virtual light source direction. For a spot light source (for example, a camera flash), in addition to the 3D position of the virtual light source, the user may provide a direction vector to indicate the primary spot direction. In an embodiment, the spot source may be associated with a directional diagram to indicate one or more preferred directions for increased brightness. In an example embodiment, the processor 202 is configured to, with the content of the memory 204, and optionally with other components described herein, to cause the apparatus 200 to normalize the one or more vectors. It is noted multiple such vectors representing multiple virtual light sources may be received by the apparatus 200 as an indication for modifying the illumination of the image along the direction of the vectors. In an example embodiment, a processing means may be configured to receive at least one virtual light source indication for modifying an illumination associated with the image. An example of the processing means may include the processor 202, which may be an example of the controller 108.

In an example embodiment, the processor 202 is configured to, with the content of the memory 204, and optionally with other components described herein, to cause the apparatus 200 to modify the illumination associated with the image by modifying brightness associated with one or more super pixel cell areas from among the plurality of super pixel cell areas based on the at least one virtual light source indication and surface orientations corresponding to the one or more super pixel cell areas. In an embodiment, modifying brightness associated with the one or more super pixel cell areas includes performing one of (1) increasing brightness of pixels included within a super pixel cell area from among the one or more super pixel cell areas if a surface orientation corresponding to the super pixel cell area is facing the virtual light source direction represented by the vector, and (2) decreasing brightness of pixels included within a super pixel cell area from among the one or more super pixel cell areas if a surface orientation corresponding to the super pixel cell area is facing in a different direction from the virtual light source direction represented by the vector. It is noted that the term 'illumination' is used herein with reference to the image and term 'brightness' is used with reference to super pixel cell areas and pixels included therein. It is understood that the term 'illumination' refers to an overall brightness of the image as afforded by the individual brightness of the pixels within the super pixel cell areas constituting the image. It is also noted that the processor 202 is configured to, with the content of the memory 204, and optionally with other components described herein, to cause the apparatus 200 to estimate an existing brightness of the pixels, for example in terms of red-green-blue (RGB) color composition, and record the estimated brightness of the plurality of pixels within the various super pixel cell areas in the memory 204. As such, modifying an illumination of the image refers to modifying brightness of one of more super pixel cell areas, or for example, modifying brightness of pixels within one or more super pixel cell areas from their corresponding current brightness levels.

As explained with reference to FIGS. 3 and 4, each super pixel cell area is associated with a surface orientation. If a surface orientation of the super pixel cell area is facing in a direction of the vector representing a virtual light source direction, then a brightness of pixels included within the super pixel cell areas is increased. If the surface orientation of the super pixel cell area is facing in a different direction the vector representing the virtual light source direction, then the brightness of the pixels included within the super pixel cell area is decreased.

In an embodiment, the virtual light source may be chosen (for example, by the user) to simulate a far away light source (for example, the sun) and accordingly, the virtual light source direction may in effect be in the form of parallel rays, In such a case, brightness associated with pixels of all the super pixel cell areas within the image may be modified based on their corresponding surface orientations vis-à-vis the vector representing the far away virtual light source direction. In an embodiment, the virtual light source may be chosen to be an isotropic light source, for example, a candle, or a spot source, such as a camera flash. In an embodiment, brightness of pixels for only those super pixel cell areas, which lie within a solid angle subtended by the light projected from a directional light source, such as a lampshade, may be modified.

In an example embodiment, an individual brightness of a pixel from among the pixels included within the super pixel cell area is modified in proportion to current pixel brightness. For example, if pixel brightness of two pixels A and B are −20 and −30 units, then an increase in brightness by 10 units may be applied proportionally, for example, pixel brightness of A and B are changed to −10 and −20 units from an existing pixel brightness. In the above example the pixel brightness is depicted as being measured in units for simplifying an illustration of proportional modification of the current pixel brightness, however, it is understood that the proportional modification may be performed in terms of RGB, cyan-magenta-yellow-black (CMYK), or any such color space elements.

In an example embodiment, modification of the individual brightness of the pixel is further performed based on an original color of the pixel, a depth information associated with the pixel and at least one pre-determined factor associated with one or more virtual light sources corresponding to the at least one virtual light source direction. In an embodiment, the at least one pre-determined factor includes a color associated with each virtual light source from among the one or more virtual light sources and a power factor associated with the each virtual light source. For example, in addition to the surface orientation of the super pixel cell area and the vector representing the virtual light source direction, the existing color of the pixel, a depth information of the pixel, a color of the virtual light source, a power of the virtual light source and optionally, a directional diagram (for example, the solid angle subtended by a directional light source) may also be factored during modifying a brightness of a pixel within a super pixel cell area. In an embodiment, each virtual light source may be associated with a color spectrum and a directional diagram. Accordingly, the modification of the brightness of the pixel may factor a cumulative effect of depth, color and power associated with one or more virtual light sources during modifying an illumination associated with the image.

In an embodiment, the processor 202 is configured to, with the content of the memory 204, and optionally with other components described herein, to cause the apparatus 200 to modify a color associated with one or more super pixel cell areas from among the plurality of super pixel cell areas based on the color associated with the each virtual light source from among the one or more virtual light sources. For example, if a color of a virtual light source corresponds to a non-white color, than in addition to modifying a brightness of the one or more super pixel cell areas, color associated with the one or more super pixel cell areas may also be modified.

In an embodiment, modifying brightness associated with the one or more super pixel cell areas includes performing one of removing brightness and adding brightness from individual super pixel cell areas. In an embodiment, the one or more super pixel cell areas correspond to one of an image foreground region and an image background region identified based on the depth information associated with the image. For example, a user may intend to modify only an image foreground region or an image background region. Accordingly, a brightness of the pixels within super pixel cell areas only within a selected region (for example, regions within the image differentiated based on the depth information) may be modified. In an example embodiment, the brightness of the pixels may be modified in such a manner that the image illumination may be limited to only one image region, such as image background region or the image foreground region. In an example embodiment, brightness may be added to a dark foreground region, or, the brightness may be lowered in the background region based on the vector representing the virtual light source direction and the surface orientations of the super pixel cell areas within the selected region. In an embodiment, the processor 202 is configured to, with the content of the memory 204, and optionally with other components described herein, to cause the apparatus 200 to define threshold limits, for example, an upper depth limit and a lower depth limit within which the brightness may be modified to illuminate a subject in the image in contre-jour without modifying the image background region, or to darken the image background region without modifying the subject of the image.

In an embodiment, modifying the illumination associated with the image comprises performing one of gradual attenuation and abrupt attenuation of the brightness associated with the one or more super pixel cell areas along the virtual light source direction represented by the vector. For example, the brightness of the pixels may be abruptly attenuated as explained above in conjunction with foreground/background regions, or may be lowered gradually along with increasing (or decreasing) depth information to simulate the effects of light diffusion and/or absorption. In an embodiment, the processor 202 is configured to, with the content of the memory 204, and optionally with other components described herein, to cause the apparatus 200 to define a diffusion/dispersion factor describing a rate of decreasing the brightness of pixels with corresponding increase in depth (for example for illuminating closest objects in the image more than the image background region). In an example embodiment, a processing means may be configured to modify the illumination associated with the image by modifying brightness associated with one or more super pixel cell areas from among the plurality of super pixel cell areas based on the at least one vector and surface orientations corresponding to the one or more super pixel cell areas. An example of the processing means may include the processor 202, which may be an example of the controller 108. The modification of the illumination associated with an image is further explained with reference to FIGS. 5A, 5B and 5C.

Figure 5A:
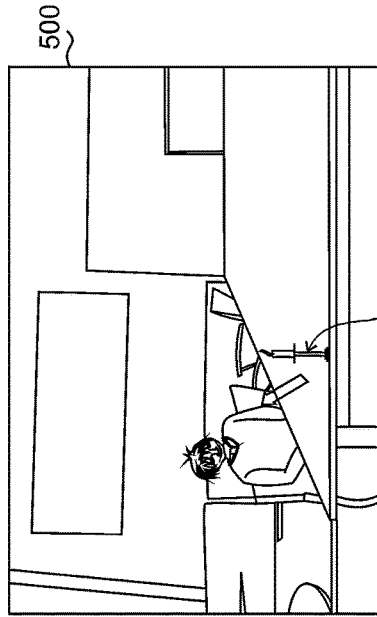
FIGS. 5A, 5B and 5C depict a simplified overview of provisioning of a virtual light source in an image associated for modifying the illumination associated with the image in accordance with an example embodiment.
Figure 5B:
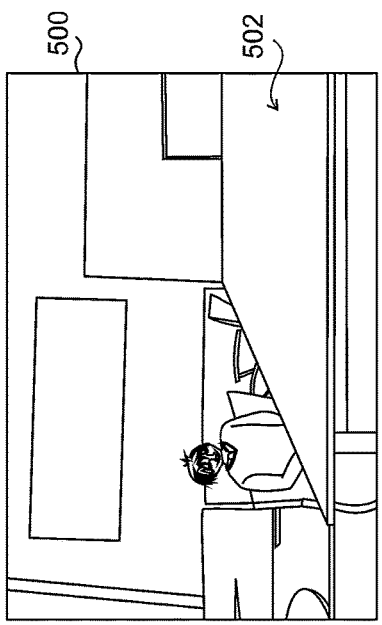
Figure 5C:
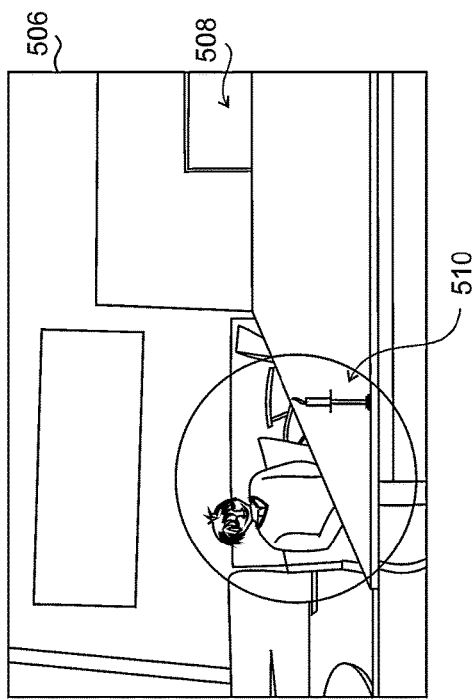

FIGS. 5A, 5B and 5C depict a simplified overview of provisioning of a virtual light source in an image for modifying the illumination associated with the image in accordance with an example embodiment. For example, FIG. 5A illustrates an image 500 depicting a person seated in an indoor environment. The image 500 is associated with a current illumination, referred herein as first illumination 502, on account of illumination from ambient light source (not depicted in FIG. 5A). The illumination associated with the image 500 (for example, the first illumination 502) may be estimated by determining the brightness associated with each super pixel cell area associated with the image 500. Further, a surface orientation for each super pixel cell area may also be determined as explained with reference to FIGS. 3 and 4. FIG. 5B depicts a provisioning of a vector (depicted as a block arrow) representing a virtual light source direction associated with a virtual light source 504 (depicted to be a candle) in the image 500 for modifying the illumination associated with the image 500. It is understood that since the candle is an isotropic source providing light in a plurality of directions, the user may provide a 3D position of the candle and one or more vectors may be computed by connecting the 3D position with centers of individual super pixel cell areas. In FIG. 5B, the vector is depicted to symbolize the provisioning of the 3D position and the subsequent computation of the vectors. Moreover, the vector is depicted to face an image subject for illustration purposes. The surface orientation of each super pixel cell area may be classified as one of facing in the direction of the vector or in a direction different from the direction of the vector and accordingly the brightness associated with pixels within the super pixel cell areas may be increased or decreased. For example, if a surface orientation of a super pixel cell area is facing the vector, then a brightness of the pixels within the super pixel cell area is increased. However, if a surface orientation of a super pixel cell area is facing in a different direction than the vector, then the brightness associated with the super pixel cell area is decreased. In an embodiment, pixel brightness associated with pixels included within a super pixel cell area of the one or more super pixel cell areas are proportionally modified based on corresponding current pixel brightness as explained with reference to FIG. 2. One or more super pixel cell areas may be accordingly modified for generating the image 506. FIG. 5C depicts a modified image, for example the image 506 associated with a modified illumination 508, generated upon modifying the first illumination 502 associated with the image 500 of FIG. 5A. As can be seen from FIG. 5C, the modified illumination 508 includes an enlightened portion 510 (corresponding to the candle brightness) with corresponding decrease in the brightness of the area adjoining the enlightened portion 510. An illumination associated with the image 500 may similarly be modified based on one or more light sources to facilitate a variety of applications, such as virtual reality applications, imaging effects and the like. In FIGS. 5A, 5B and 5C, the virtual light source is depicted to an isotropic light source (for example, the candle). However, the virtual light source may also be a far away light source (for example, the sun) or a spot source (for example, a flash lighting). It is noted that appropriate steps may be followed based on the type of virtual light source as explained with reference to FIG. 2. For example, for a spot source, the user may provide a directional vector in addition to providing the 3D position of the spot source. Further, information concerning a power of the spot source, a color of the virtual light source, original color of the pixel, a directional diagram and three-dimensional position of the pixel and the like may also be factored in modifying brightness of pixels associated with the super pixel cell areas. In an example embodiment, the processor 202 is configured to, with the content of the memory 204, and optionally with other components described herein, to cause the apparatus 200 to display the image subsequent to modifying the illumination associated with the image.

Referring now to FIG. 2, in an embodiment, the processor 202 is configured to, with the content of the memory 204, and optionally with other components described herein, to cause the apparatus 200 to determine a light source direction corresponding to a primary light source illuminating the image, such as the image 300 of FIG. 3. In an embodiment, a plurality of non-overlapping regions in the image is identified. For example, the brightest non-overlapping regions in a partitioned image are identified, such that each non-overlapping region includes at least one super pixel cell area and the super pixel cell areas within each non-overlapping region are associated with substantially same color. In other words, the plurality of non-overlapping regions are chosen such that the identified regions are associated with higher level of brightness than regions including remaining super pixel cell areas in the image.

In an embodiment, the processor 202 is configured to, with the content of the memory 204, and optionally with other components described herein, to cause the apparatus 200 to compute region surface orientations for the plurality of non-overlapping regions. A region surface orientation is indicative of a surface orientation of the corresponding non-overlapping region. In an embodiment, the surface orientations corresponding to the super pixel cell areas (as explained with reference to FIG. 4) included within each non-overlapping region are averaged to compute the corresponding region surface orientation. Accordingly, each non-overlapping region is associated with a region surface orientation.

In an embodiment, the processor 202 is configured to, with the content of the memory 204, and optionally with other components described herein, to cause the apparatus 200 to compute depth estimates and brightness estimates for the plurality of non-overlapping regions. For example, a depth estimate and a brightness estimate are computed for each non-overlapping region. In an embodiment, the depth estimate for a non-overlapping region corresponds to an average depth of the super pixel cell areas included within the non-overlapping region. In an embodiment, the brightness estimate for a non-overlapping region corresponds to brightness associated with a brightest super pixel cell area from among the super pixel cell areas included within the non-overlapping region.

In an embodiment, the processor 202 is configured to, with the content of the memory 204, and optionally with other components described herein, to cause the apparatus 200 to assign weights to the region surface orientations corresponding to the plurality of non-overlapping regions. In an embodiment, a weight is assigned to a region surface orientation based on a depth estimate and a brightness estimate computed for a corresponding non-overlapping region. In an embodiment, the processor 202 is configured to, with the content of the memory 204, and optionally with other components described herein, to cause the apparatus 200 to determine the light source direction corresponding to the primary light source illuminating the image by computing a weighted average of the region surface orientations based on the assigned weights. In an embodiment, a direction corresponding to the weighted average of the region surface orientations is determined as the light source direction. The determination of the light source direction is further explained with the help of illustrative example in FIG. 6.

Figure 6:
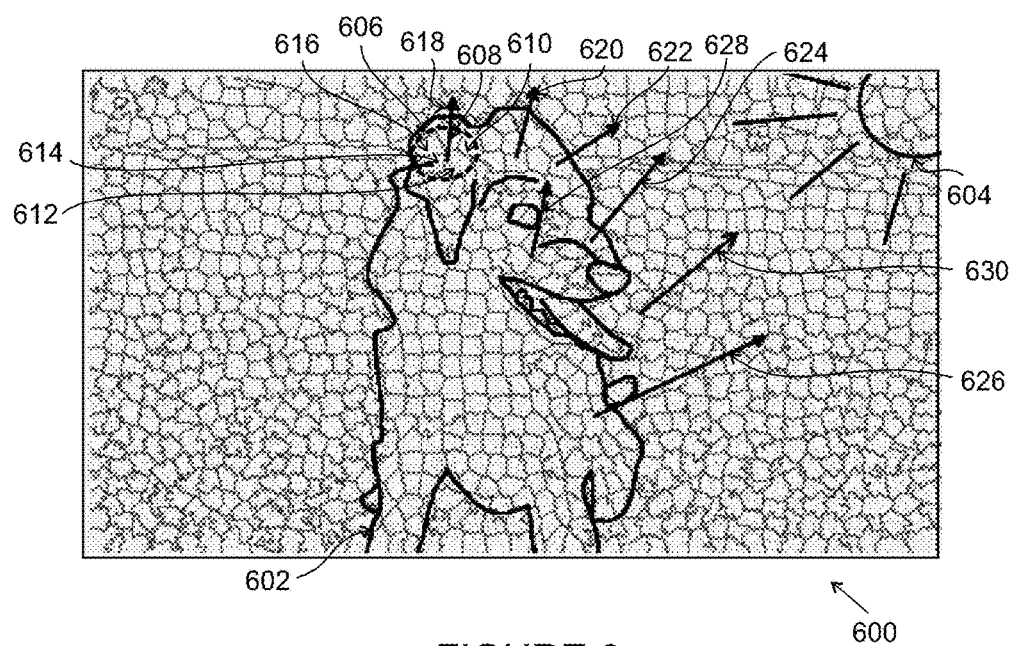
FIG. 6 depicts an example visual representation of an image for illustrating determination of a light source direction corresponding to a primary light source illuminating the image in accordance with an example embodiment.

FIG. 6 depicts an example visual representation of an image 600 for illustrating determination of a light source direction corresponding to a primary light source illuminating the image 600 in accordance with an example embodiment. The image 600 depicts an object 602 (for example, a dog in the image 600) and a primary light source 604 (for example, the sun in the image 600) illuminating the image. It is noted that the objects, such as the object 602, in the image 600 may be illuminated by more than one light source, however, a primary light source from among the light sources in the image 600 is depicted to be the primary light source 604. It is understood that the term 'primary light source' implies a light source contributing the most to the illumination associated with the image 600. The image 600 is depicted to be partitioned into a plurality of super pixel cell areas as explained with reference to FIG. 3.

For determining a light source direction associated with the primary light source 604, a plurality of non-overlapping regions is identified. Each non-overlapping region is associated with substantially same color and includes at least one super pixel cell area. Further, the non-overlapping regions are identified such that the identified non-overlapping regions are associated with higher levels of brightness than other regions including remaining super pixel cell areas in the image 600. In an embodiment, the processor 202 is configured to, with the content of the memory 204, and optionally with other components described herein, to cause the apparatus 200 of FIG. 2 to identify a plurality of non-overlapping regions (for example, non-overlapping groups of super pixel cell areas) with the higher level of brightness and substantially same color from the partitioned image 600. For example, in the image 600, a region 606 (marked by a dotted circle) is depicted to be identified as one such region. The region 606 is depicted to include super pixel cell areas, such as the super pixel cell area 608, 610, 612, 614 and 616 which are substantially of the same color (and with slightly different level of brightness). It is understood that a plurality of such regions (for example, non-overlapping with each other) may be identified in the image 600.

In an embodiment, the processor 202 is configured to, with the content of the memory 204, and optionally with other components described herein, to cause the apparatus 200 of FIG. 2 to compute a region surface orientation for each non-overlapping region. As explained with reference to FIGS. 2 and 3, a surface orientation is determined for each super pixel cell area in an image. An average surface orientation may be computed based on the surface orientations of the super pixel cell areas within a region to determine a region surface orientation. In FIG. 6, the surface orientations for the super pixel cell areas 608, 610, 612, 614 and 616 within the region 606 may be averaged to generate the region surface orientation 618 for the region 606. In FIG. 6, five other region surface orientations 620, 622, 624, 626 and 628 are depicted to be generated for the corresponding non-overlapping regions (not shown in FIG. 6).

In an embodiment, depth estimates and brightness estimates for the plurality of non-overlapping regions are computed. For example, a depth estimate and a brightness estimate are computed for each non-overlapping region. In an embodiment, the depth estimate for a non-overlapping region corresponds to an average depth of the super pixel cell areas included within the non-overlapping region. In an embodiment, the brightness estimate for a non-overlapping region corresponds to brightness associated with a brightest super pixel cell area from among the super pixel cell areas included within the non-overlapping region. For example, for the region 606, depth information associated with the super pixel areas 608, 610, 612, 614 and 616 is determined and averaged to compute the depth estimate for the region 606. Similarly, a brightness estimate of the region 606 corresponds to the brightness of the brightest super pixel cell area from among the super pixel cell areas 608, 610, 612, 614 and 616.

In an embodiment, weights are assigned to each region surface orientation from among the region surface orientations, 618, 620, 622, 624, 626 and 628 based on the depth estimate and brightness estimate of the corresponding non-overlapping region. For example, the region surface orientation 618 may be assigned a weight based on the depth estimate and the brightness estimate of the region 606. For example, a higher weight may be assigned to a region surface orientation for a region associated with lesser depth estimate (for example, a region closer to a image capturing element, such as the stereo camera 208). In another example, a higher weight may be assigned to a region surface orientation for a region associated with higher level of brightness from among the plurality of non-overlapping regions. It is understood the assigning of weights to the region surface orientations may not be limited to factors explained above, and, accordingly the weights may be assigned based on a plurality of factors. In an embodiment, the processor 202 is configured to, with the content of the memory 204, and optionally with other components described herein, to cause the apparatus 200 of FIG. 2 to determine the light source direction by averaging the region surface orientations based on the assigned weights. In FIG. 6, the region surface orientations 618, 620, 622, 624, 626 and 628 are averaged based on corresponding assigned weights to generate an average region surface orientation 630, a direction of which corresponds to the light source direction of the primary light source 604.

It is understood that an accuracy of the determination of the light source direction may depend upon a plurality of factors, such as an accuracy of the depth map in a region of super pixel cell areas for which the brightness is compared, a presence of additional light sources other than the primary light source illuminating the image, a presence/absence of light sources as a part of the image (wherein the light sources are treated as objects), a presence of illuminations or occlusions in an image scene (for example, an image scene involving a mix of indoor and outdoor environment) corresponding to the image, contre-jour or light direction having a negative z component (z being the depth axis oriented towards the background) and the like. A method for modifying an illumination associated with an image is explained with reference to FIG. 7.

Figure 7:
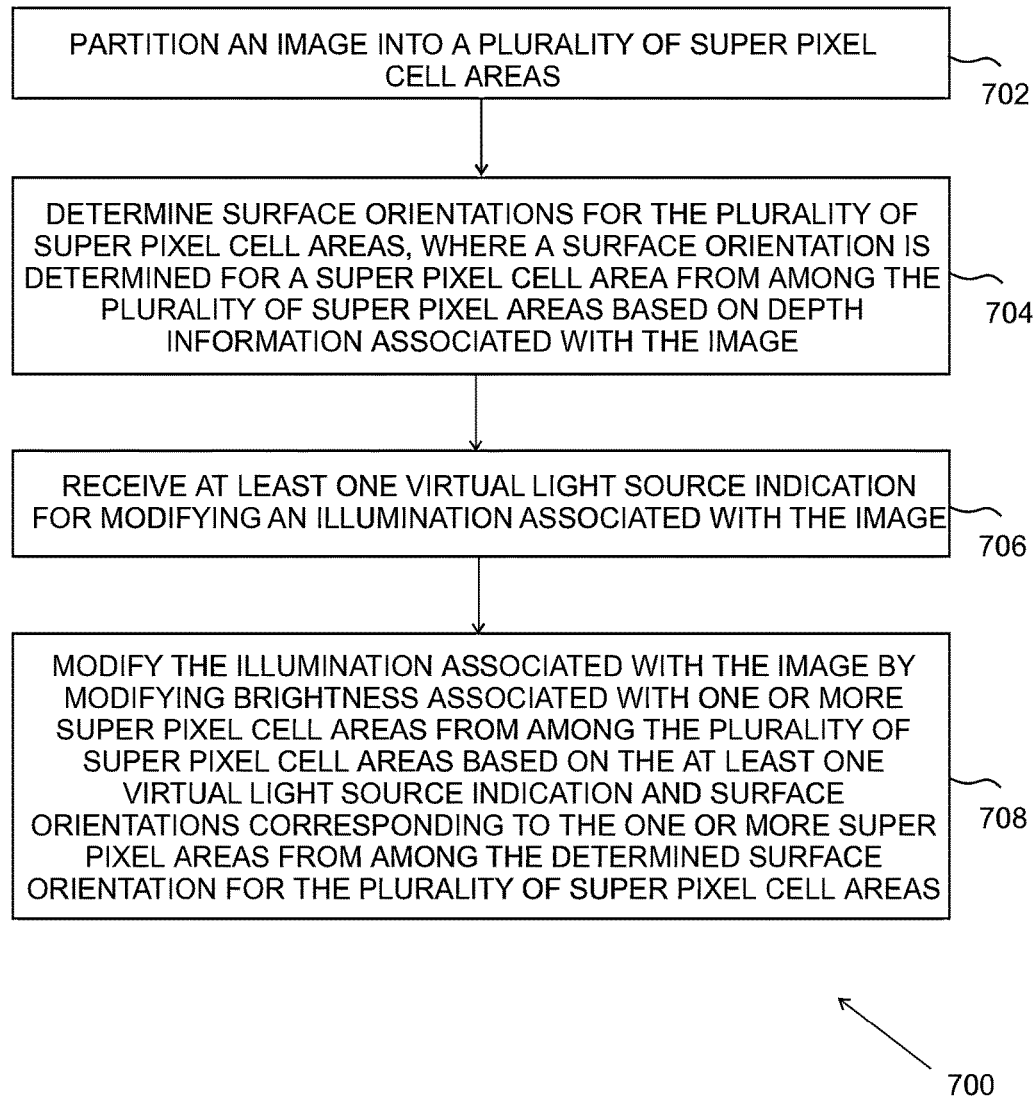
FIG. 7 is a flowchart depicting an example method for modifying illumination in an image in accordance with an example embodiment.

FIG. 7 is a flowchart depicting an example method 700 for modifying illumination in an image in accordance with an example embodiment. The method 700 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 700 are described with help of apparatus 200 of FIG. 2. However, the operations of the method can be described and/or practiced by using any other apparatus.

At block 702 of method 700, an image is partitioned into a plurality of super pixel cell areas. For example, the image may be partitioned into a plurality of super pixel cell areas (for example, sets of pixels), such that each super pixel cell area includes a plurality of pixels as depicted in FIG. 3. In an embodiment, image partitioning/segmentation techniques may be utilized for partitioning of the image into a plurality of super pixel cell areas. Examples of the image partitioning/ segmentation techniques may include, but are not limited to, thresholding techniques, clustering algorithms (for example, K means algorithm), edge detection techniques and the like.

At block 704, surface orientations for the plurality of super pixel cell areas are determined. In an example embodiment, a surface orientation (for example, an angle subtended by a surface associated with a super pixel cell area to a light source at the time of image capture) may be determined for each super pixel cell area from among the plurality of super pixel cell areas based on depth information associated with the image. The determination of a surface orientation for a super pixel cell area may be performed as explained with reference to FIG. 4.

At block 706, at least one virtual light source indication is received for modifying an illumination associated with the image. In an embodiment, receiving the at least one virtual light source indication includes receiving at least one vector, where a vector is indicative of a virtual light source direction. In an embodiment, receiving the at least one virtual light source indication includes receiving at least one virtual light source position. A virtual light source position includes one of two-dimensional (2D) positional information and three-dimensional (3D) positional information corresponding to a virtual light source. In an example embodiment, the processor 202 is configured to, with the content of the memory 204, and optionally with other components described herein, to cause the apparatus 200 to compute at least one vector from the at least one virtual light source position. In an embodiment, a vector from among the at least one vector is indicative of a virtual light source direction. The virtual light source indication may be received based on the type of virtual light source as explained with reference to FIG. 2.

At block 708, the illumination associated with the image may be modified by modifying brightness associated with one or more super pixel cell areas from among the plurality of super pixel cell areas based on the at least one virtual source indication and surface orientations corresponding to the one or more super pixel cell areas from among the determined surface orientations for the plurality of super pixel cell areas. In an embodiment, modifying brightness associated with the one or more super pixel cell areas includes performing one of (1) increasing brightness of pixels included within a super pixel cell area from among the plurality of super pixel cell areas if a surface orientation corresponding to the super pixel cell area is facing the virtual light source direction represented by the vector, and (2) decreasing a brightness of pixels included within a super pixel cell area from among the plurality of super pixel cell areas if a surface orientation corresponding to the super pixel cell area is facing in a different direction from the virtual light source direction represented by the vector.

In an example embodiment, an individual brightness of a pixel from among the pixels included within the super pixel cell area is modified in proportion to current pixel brightness as explained with reference to FIG. 2. In an example embodiment, modification of the individual brightness of the pixel is further performed based on an original color of the pixel, a depth information associated with the pixel and at least one pre-determined factor associated with one or more virtual light sources corresponding to the at least one virtual light source direction. In an embodiment, the at least one pre-determined factor includes a color associated with each virtual light source from among the one or more virtual light sources and a power factor associated with the each virtual light source. For example, in addition to the surface orientation of the super pixel cell area and the vector representing the virtual light source direction, the existing color of the pixel, a depth information of the pixel, a color of the virtual light source, a power of the virtual light source and optionally, a directional diagram (for example, the solid angle subtended by a directional light source) may also be factored during modifying a brightness of a pixel within a super pixel cell area. In an embodiment, each virtual light source may be associated with a color spectrum and a directional diagram. Accordingly, the modification of the brightness of the pixel may factor a cumulative effect of depth, color and power associated with one or more virtual light sources during modifying an illumination associated with the image.

In an embodiment, color associated with one or more super pixel cell areas from among the plurality of super pixel cell areas is modified based on the color associated with the each virtual light source from among the one or more virtual light sources. For example, if a color of a virtual light source is different from white color, than in addition to modifying a brightness of the one or more super pixel cell areas, color associated with the one or more super pixel cell areas may also be modified.

In an embodiment, modifying brightness associated with the one or more super pixel cell areas includes performing one of removing brightness and adding brightness from individual super pixel cell areas. In an embodiment, the one or more super pixel cell areas correspond to one of an image foreground region and an image background region identified based on the depth information associated with the image as explained with reference to FIG. 2. In an embodiment, modifying the illumination associated with the image includes performing one of gradual attenuation and abrupt attenuation of the brightness associated with the one or more super pixel cell areas along the virtual light source direction represented by the one vector. For example, the brightness of the pixels may be abruptly attenuated as explained above in conjunction with foreground/background regions, or may be lowered gradually along with increasing (or decreasing) depth information to simulate the effects of light diffusion and/or absorption. In an embodiment, the modification of the image illumination may be performed as explained with reference to FIGS. 5A, 5B and 5C.

In an embodiment, a light source direction corresponding to a primary light source illuminating the image may be determined. In an embodiment, a plurality of non-overlapping regions in the image is identified. For example, the brightest non-overlapping regions in a partitioned image are identified, such that each non-overlapping region includes at least one super pixel cell area and the super pixel cell areas within each non-overlapping region are associated with substantially same color. In other words, the plurality of non-overlapping regions are chosen such that the identified regions are associated with higher level of brightness than regions comprising remaining super pixel cell areas in the image.

In an embodiment, region surface orientations for the plurality of non-overlapping regions are computed. A region surface orientation is indicative of a surface orientation of the corresponding non-overlapping region. In an embodiment, the surface orientations determined for the super pixel cell areas (as explained with reference to FIG. 4) included within each non-overlapping region are averaged to compute the corresponding region surface orientation. Accordingly, each non-overlapping region is associated with a region surface orientation.

In an embodiment, depth estimates and brightness estimates are computed for the plurality of non-overlapping regions. For example, a depth estimate and a brightness estimate are computed for each non-overlapping region. In an embodiment, the depth estimate for a non-overlapping region corresponds to an average depth of the super pixel cell areas included within the non-overlapping region. In an embodiment, the brightness estimate for a non-overlapping region corresponds to brightness associated with a brightest super pixel cell area from among the super pixel cell areas included within the non-overlapping region.

In an embodiment, weights are assigned to the region surface orientations corresponding to the plurality of non-overlapping regions. In an embodiment, a weight is assigned to a region surface orientation based on a depth estimate and a brightness estimate computed for a corresponding non-overlapping region. In an embodiment, the light source direction corresponding to the primary light source illuminating the image is determined by computing a weighted average of the region surface orientations based on the assigned weights. In an embodiment, a direction corresponding to the weighted average of the region surface orientations is determined as the light source direction. The determination of the light source direction may be performed as explained with reference to FIG. 6. Another method for modifying an illumination associated with an image is explained with reference to FIG. 8.

Figure 8:
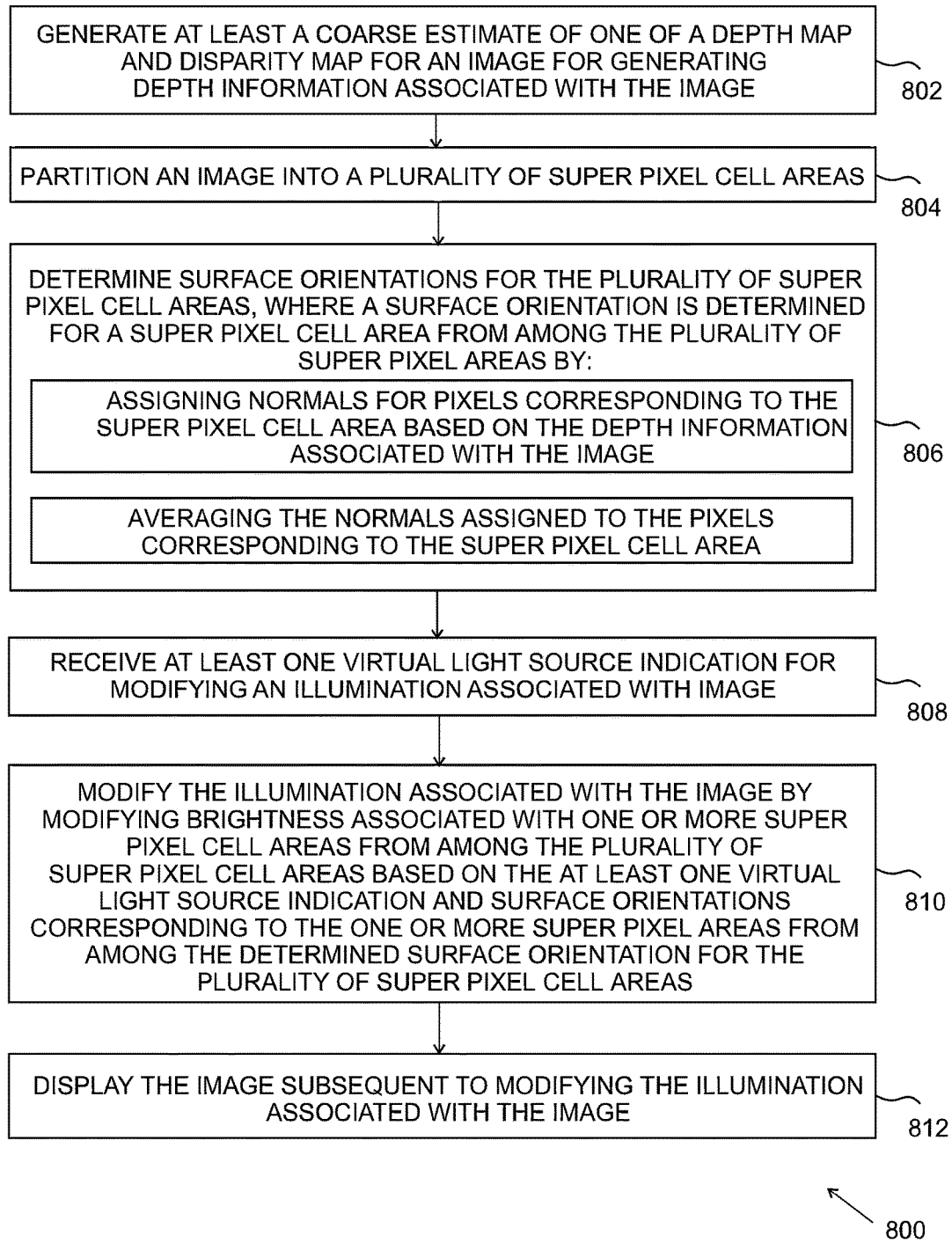
FIG. 8 is a flowchart depicting an example method for modifying illumination in an image in accordance with another example embodiment.

FIG. 8 is a flowchart depicting an example method 800 for modifying illumination in an image in accordance with another example embodiment. The method 800 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 800 are described with help of apparatus 200 of FIG. 2. However, the operations of the method can be described and/or practiced by using any other apparatus.

At block 802 of method 800, at least a coarse estimate of one of a depth map and disparity map is generated for the image for generating depth information associated with the image. In an embodiment, the coarse estimate of a disparity map may be derived from a stereo pair of images (including the image as one of the images from among the stereo pair of images) captured by a stereo camera. An estimate of the depth map may be derived from the disparity map. The difference in angle of capture of a scene by the pair of cameras in the stereo camera may be utilized to geometrically derive a distance of the object from the stereo camera to construct the depth/disparity map. The generation of the coarse estimate of the depth map or the disparity map may be performed using any of a number of known techniques and is not explained herein for sake of brevity.

At block 804, an image is partitioned into a plurality of super pixel cell areas. The partitioning of the image into the plurality of super pixel cell areas is performed as explained with reference to block 702 in FIG. 7 and is not explained herein. At block 806, surface orientations for the plurality of super pixel cell areas are determined. In an embodiment, a surface orientation for a super pixel cell area from among the plurality of super pixel cell areas is determined by (1) assigning normals for pixels corresponding to the super pixel cell area based on depth information associated with the image and (2) averaging the normals assigned to the pixels to generate an average normal. In an embodiment, a direction of the average normal for a super pixel cell area may be considered as an indication of the surface orientation of the super pixel cell area. A surface orientation may similarly be computed for each super pixel cell area in the partitioned image.

In an embodiment, the determination of the surface orientation for a super pixel cell area results in one or more artefacts, which may degrade a quality of the image upon subsequent modification of an image illumination. For example, on account of partitioning the image into super pixel cell areas and on account of normal discontinuities between two adjacent pixels on super pixel cell edges, faceting artefacts may be generated which be result in image degradation. In an example embodiment, one or more filters may be employed to counteract artefacts generated during the determination of the surface orientation for the super pixel cell area. In an example embodiment, a shading filter, such as Phong shading filter may be employed to counteract the faceting artefacts generated during the determination of the surface orientation for the super pixel cell area. In an example embodiment, a filter configured to preclude depth discontinuities inside a super pixel cell area may be employed to counteract artefacts resulting from depth estimation errors or segmentation errors at a pixel level.

At block 808, at least one virtual light source indication is received for modifying an illumination associated with the image. At block 810, the illumination associated with the image may be modified by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas. The receiving of the at least one vector and modification of the illumination of the image are performed as explained with reference to blocks 706 and 708 in FIG. 7. At block 812, the modified image associated with the second illumination is displayed.

To facilitate discussion of the methods 700 and 800, certain operations are described herein as constituting distinct steps performed in a certain order. Such implementations are example and non-limiting. Certain operation may be grouped together and performed in a single operation, and certain operations can be performed in an order that differs from the order employed in the examples set forth herein. Moreover, certain operations of the method 700 and 800 are performed in an automated fashion. These operations involve substantially no interaction with the user. Other operations of the methods 700 and 800 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to facilitate modifying illumination in an image. The image illumination may need to be modified on account of variety of reasons, such as for example, for facilitating virtual reality applications, for introducing lighting effects (e.g. black and white pictures) and the like. Such a modification in illumination in an image reduces complexity by precluding the use of special editing devices and software for controlling imaging artefacts. Further, such techniques preclude the need to reconstruct a 3D model of the scene to generate a good depth map for changing the illumination of the image. Further, resource consuming 3D reconstruction processing is also avoided on account of modifying image illumination in such a manner. Further, example embodiments disclosed herein facilitate the determination of a light source direction of a primary light source illuminating the image. The determination of the light source direction of the primary light source may be utilized for smoothening hard shadows or for compensating brightness differences. For example, if a shadow covers half of an object face in the captured image and the remaining half of the object face is illuminated, then the determined light source direction of the primary light source may be utilized to illuminate the entire object face. In an embodiment, the determined light source direction of a primary light source may be utilized for automatically sorting/retrieving images according to the estimated direction, or to provide inputs to a shadow detector associated with the image capture element, such as the stereo camera 208.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

We claim:

1. A method comprising:
    partitioning an image into a plurality of super pixel cell areas;
    determining surface orientations for the plurality of super pixel cell areas, wherein a surface orientation is determined for a super pixel cell area from among the plurality of super pixel cell areas based on depth information associated with the image;
    receiving at least one virtual light source indication for modifying an illumination associated with the image; and
    modifying the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

2. An apparatus comprising:
    at least one processor; and
    at least one memory comprising computer program code, the at least one memory and the computer program code configured to, with the at least one processor, cause the apparatus to at least perform:
        partition an image into a plurality of super pixel cell areas;
        determine surface orientations for the plurality of super pixel cell areas, wherein a surface orientation is determined for a super pixel cell area from among the plurality of super pixel cell areas based on depth information associated with the image;
        receive at least one virtual light source indication for modifying an illumination associated with the image; and
        modify the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

3. The apparatus as claimed in claim 2, wherein to determine the surface orientation for the super pixel cell area, the apparatus is further configured to:
    assign normals for pixels corresponding to the super pixel cell area based on the depth information associated with the image, and
    average the normals assigned to the pixels to generate an average normal, wherein the average normal is determined as the surface orientation for the super pixel cell area.

4. The apparatus as claimed in claim 3, wherein the apparatus is further configured to employ one or more filters for counteracting artefacts generated during the determination of the surface orientation for the super pixel cell area.

5. The apparatus as claimed in claim 3, wherein the apparatus is further configured to generate at least a coarse estimate of one of a depth map and disparity map for the image for generating the depth information associated with the image.

6. The apparatus as claimed in claim 2, wherein to receive the at least one virtual light source indication, the apparatus is further configured to receive at least one vector, wherein a vector from among the at least one vector is indicative of a virtual light source direction.

7. The apparatus as claimed in claim 2, wherein to receive the at least one virtual light source indication, the apparatus is further configured to receive at least one virtual light source position, wherein a virtual light source position from among the at least one virtual light source position comprises one of two-dimensional positional information and three-dimensional positional information corresponding to a virtual light source.

8. The apparatus as claimed in claim 7, wherein the apparatus is further configured to:
compute at least one vector from the at least one virtual light source position, wherein a vector from among the at least one vector is indicative of a virtual light source direction.

9. The apparatus as claimed in claim 6, wherein to modify brightness associated with the one or more super pixel cell areas, the apparatus is further configured to:
increase brightness of pixels included within a super pixel cell area from among the one or more super pixel cell areas if a corresponding surface orientation is facing the virtual light source direction represented by the vector; and
decrease brightness of pixels included within a super pixel cell area from among the one or more super pixel cell areas if a corresponding surface orientation is facing in a different direction from the virtual light source direction represented by the vector.

10. The apparatus as claimed in claim 9, wherein an individual brightness of a pixel from among pixels included within the one or more super pixel cell areas is modified in proportion to current pixel brightness.

11. The apparatus as claimed in claim 10, wherein modification of the individual brightness of the pixel is further performed based on an original color of the pixel, a depth information associated with the pixel and at least one pre-determined factor associated with one or more virtual light sources corresponding to the at least one virtual light source indication, the at least one criteria comprising a color associated with each virtual light source from among the one or more virtual light sources and a power factor associated with the each virtual light source.

12. The apparatus as claimed in claim 11, wherein the apparatus is further configured to modify a color associated with one or more super pixel cell areas from among the plurality of super pixel cell areas based on the color associated with the each virtual light source from among the one or more virtual light sources.

13. The apparatus as claimed in claim 2, wherein the one or more super pixel cell areas correspond to one of an image foreground region and an image background region identified based on the depth information associated with the image.

14. The apparatus as claimed in claim 11, wherein to modify the illumination associated with the image, the apparatus is further configured to perform one of gradual attenuation and abrupt attenuation of the brightness associated with the one or more super pixel cell areas along the virtual light source direction represented by the vector.

15. The apparatus as claimed in claim 2, wherein to modify the brightness associated with the one or more super pixel cell areas, the apparatus is further configured to perform one of removing brightness and adding brightness from individual super pixel cell areas from among the one or more super pixel cell areas.

16. The apparatus as claimed in claim 2, wherein the apparatus is further configured to:
identify a plurality of non-overlapping regions in the image, each non-overlapping region from among the plurality of non-overlapping regions associated with substantially same color and comprising at least one super pixel cell area from among the plurality of super pixel cell areas, wherein the plurality of non-overlapping regions are associated with higher level of brightness than regions comprising remaining super pixel cell areas from among the plurality of super pixel cell areas;
compute region surface orientations for the plurality of non-overlapping regions, wherein a region surface orientation from among the region surface orientations corresponds to a surface orientation computed for a non-overlapping region from among the plurality of non-overlapping regions; and
determine a light source direction corresponding to a primary light source illuminating the image by computing a weighted average of the region surface orientations, wherein a direction corresponding to the weighted average of the region surface orientations is determined as the light source direction.

17. The apparatus as claimed in claim 16, wherein to compute a region surface orientation from among the region surface orientations, the apparatus is further configured to average surface orientations corresponding to the at least one super pixel cell area included within a corresponding non-overlapping region from among the plurality of non-overlapping regions.

18. The apparatus as claimed in claim 17, wherein the apparatus is further configured to:
compute depth estimates and brightness estimates for the plurality of non-overlapping regions, wherein a depth estimate from among the depth estimates and a brightness estimate from among the brightness estimates is computed for the each non-overlapping region; and
assign weights to the region surface orientations, wherein a weight is assigned to a region surface orientation from among the region surface orientations based on a depth estimate from among the depth estimates and a brightness estimate from among the brightness estimates computed for a corresponding non-overlapping region from among the plurality of non-overlapping regions, wherein the weighted average of the region surface orientations is computed based on the assigned weights.

19. The apparatus as claimed in claim 18, wherein the depth estimate for the each non-overlapping region corresponds to an average depth of the at least one super pixel cell area included within the each non-overlapping region, and, wherein the brightness estimate for the each non-overlapping region corresponds to brightness associated with a brightest super pixel cell area from among the at least one super pixel cell area included within the each non-overlapping region.

20. The apparatus as claimed in claim 2, wherein the image is one from among a stereo pair of images.

21. The apparatus as claimed in claim 2, wherein the apparatus is further configured to display the image subsequent to modifying the illumination associated with the image.

22. A computer program product comprising at least one non-transitory computer-readable storage medium, the one non-transitory computer-readable storage medium comprising a set of instructions, which, when executed by one or more processors, cause an apparatus to at least perform:
partition an image into a plurality of super pixel cell areas;
determine surface orientations for the plurality of super pixel cell areas, wherein a surface orientation is determined for a super pixel cell area from among the plurality of super pixel cell areas based on depth information associated with the image;
receive at least one virtual light source indication for modifying an illumination associated with the image; and
modify the illumination associated with the image by modifying brightness associated with one or more super pixel cell areas from among the plurality of super pixel cell areas based on the at least one virtual light source indication and surface orientations corresponding to the one or more super pixel cell areas from among the determined surface orientations for the plurality of super pixel cell areas.

\* \* \* \* \*